Nov. 24, 1970  H. W. WALLACE  3,543,061
RECIPROABLE MOTOR CORE LAMINATIONS WITH
INVOLUTE AND RADIAL SECTIONS
Filed April 16, 1969  2 Sheets-Sheet 1

INVENTOR.
HENRY W. WALLACE
BY
Harry W. Hargis III
AGENT

INVENTOR.
HENRY W. WALLACE
BY
Harry W. Hargis III
AGENT

United States Patent Office 3,543,061
Patented Nov. 24, 1970

3,543,061
RECIPROCABLE MOTOR CORE LAMINATIONS WITH INVOLUTE AND RADIAL SECTIONS
Henry W. Wallace, Ardmore, Pa., assignor to Philco-Ford Corporation, Philadelphia, Pa., a corporation of Delaware
Filed Apr. 16, 1969, Ser. No. 816,701
Int. Cl. H02k 33/02
U.S. Cl. 310—17
13 Claims

ABSTRACT OF THE DISCLOSURE

The laminations forming the core of a magnetic device, such as may be used as a reciprocating motor for driving a linear compressor, include inner and outer sections, formed as the involute of a circle, interconnected by generally planar radial sections. The laminations are packed to form a cylindrical core.

BACKGROUND OF THE INVENTION

This invention relates to electrical apparatus, and more particularly to improvements in laminated cores for cylindrically shaped magnetic devices. While of broader applicability, apparatus made in accordance with the invention has particular utility in the field of reciprocating motors.

It has been difficult to provide efficient reciprocating electrical motors. A major problem in achieving acceptable efficiency has been attainment of optimum flux in a minimum space. An ideal construction for a reciprocating electric motor comprises a cylindrical coil with a core of laminated iron, or like material, completely surrounding the coil. However it has been found difficult to produce cylindrically shaped laminated iron cores having good spatial and operating characteristics. Particularly is this the case when it is desired to use laminations stamped from sheet stock of uniform thickness.

There have been attempts in the past to achieve optimum disposition and operation by providing radially extending laminations formed in a shape corresponding to the involute of a circle, but such forming has proven to be expensive. Stamping techniques are inherently inexpensive, but a problem encountered with involute laminations is that the length of a curved stamping is limited substantially to the value at which the outer involute portion begins to curve back and, together with the inner involute section, to form an undercut relative to the elements of the stamping die.

It is the general objective of the present invention to provide a novel involute-radial lamination construction for electromagnetic devices, which greatly provides ease of fabrication and assembly while yet achieving the advantages inherent in the use of pure involute laminations.

SUMMARY OF THE INVENTION

In the achievement of the foregoing as well as other objectives, the present invention contemplates, in a generally cylindrical electromagnetic core structure, laminations of generally uniform thickness extending generally along a central axis aligned with a central, generally cylindrical region. Each lamination includes an inner and an outer involute section interconnected by a radially extending section. The radial sections are of lesser vertical extension than the involute sections whereby to form a groove coaxial with the central axis for receiving a current carrying coil. In further particular accordance with the invention, spacer means are formed integrally with each lamination and are so cooperably disposed as to accommodate a desired degree of overlapping engagement of the adjacent involute sections while establishing and maintaining the radial sections in spaced relationship.

The preferred manner in which the foregoing as well as other objectives of the invention may be achieved will be more clearly understood from a consideration of the following description, taken in light of the accompanying drawing.

DESCRIPTION OF THE PREFERRED EMBODIMENT

Figure 1:
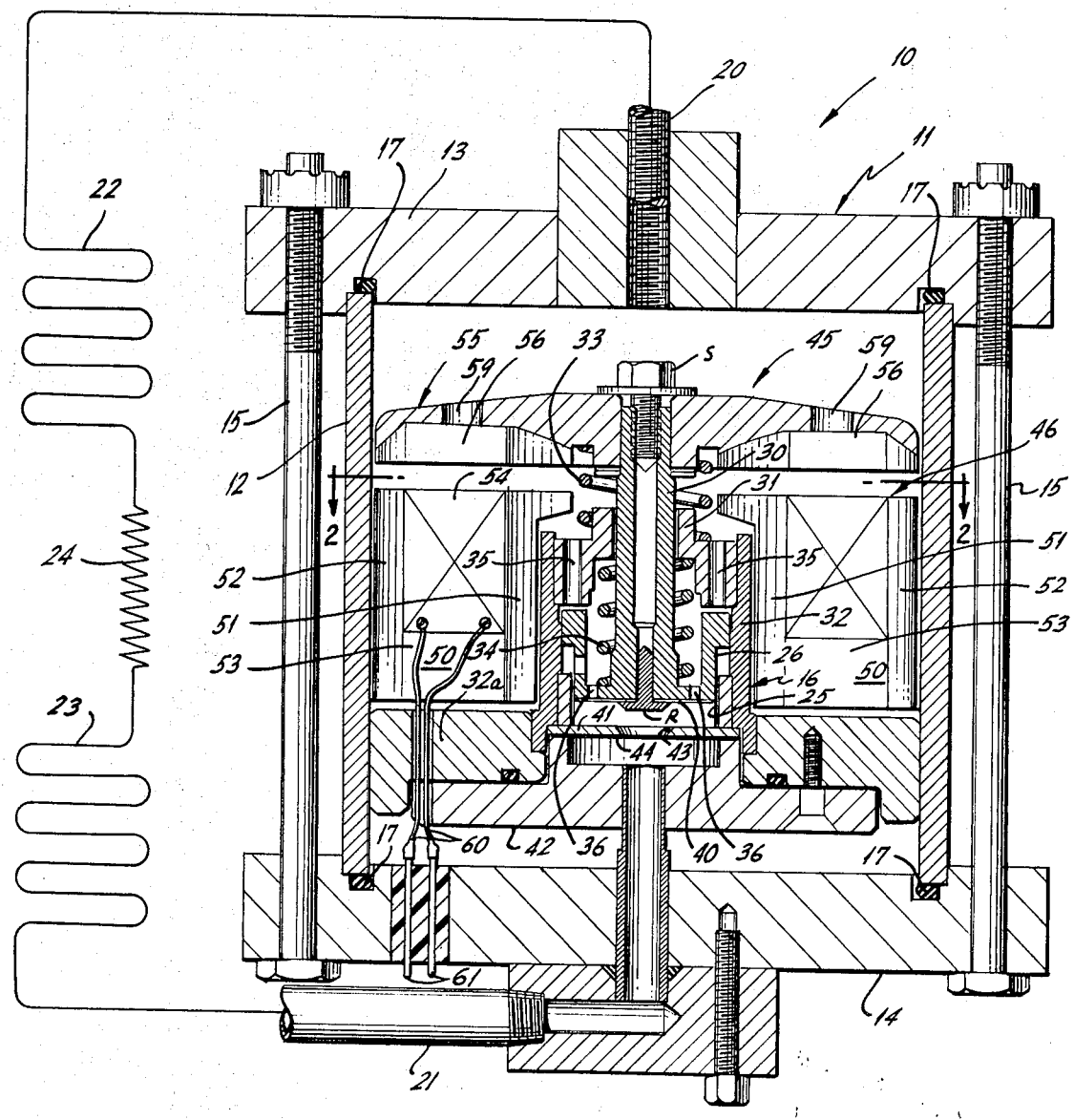
FIG. 1 is a sectional view of a reciprocating electric motor in accordance with the invention and shown as embodied in a refrigerator motor compressor of the linear type.

With more particular reference to the drawing, and first to FIG. 1, an electromagnetic device 10 comprises a sealed housing 11 made up of a central cylindrical housing portion 12. While the housing could, if such is desired, be of known unitary hermetically sealed type, in the illustrated embodiment it is provided with disk-shaped end plates 13 and 14 clamped against portion 12 by tie bolts 15. Ring shaped gaskets 17 are interposed between the end plates and cylindrical portion 12 to provide a gas-tight seal. A refrigerant compresser 16 is disposed within housing 11. Refrigerant connections for the compressor are designated generally by numerals 20 and 21, and provide for gas flow communication of the compressor with an evaporator 22 and condenser 23 joined by a restrictive capillary tube 24, in conventional series refrigerant flow circuit.

Compressor 16 includes a cylinder 25, a hollow piston 26 movable therein, and a reciprocable connecting rod 30 extending through a bearing 31 provided in a suitable, generally tubular frame 32 supported by a flanged portion 32a extending outwardly into contact with the cylindrical housing portion 12. Conveniently cylinder 25 also is supported within tubular frame 32.

A first coiled compression spring 33 reacts between the bearing sleeve 31 and a motor armature 55 affixed by a screw S to rod 30. A second coiled compression spring 34 reacts between piston 26 and bearing sleeve 31. Springs 33 and 34 coact to urge a linearly movable armature 55 and piston 26 to the illustrated, upper rest position. A set of gas flow ports 35 extend through bearing sleeve 31 to provide gas flow communication between connection 20, the interior of the housing 12, 13, 14, and the back of hollow piston 26.

Piston 26 includes suction ports 36 and a suction valve 40 operable to open and close ports 36. Valve 40 conveniently is of the leaf type and is affixed by a rivet R to rod 30. A cylinder head 41 is held in place by a clamping plate 42 secured by screws to frame portion 32a. Cylinder head 41 includes a discharge port 43, and a valve leaf 44 of conventional design operable to open and close port 43, which latter is in gas flow communication with the discharge connection 21.

Figure 2:
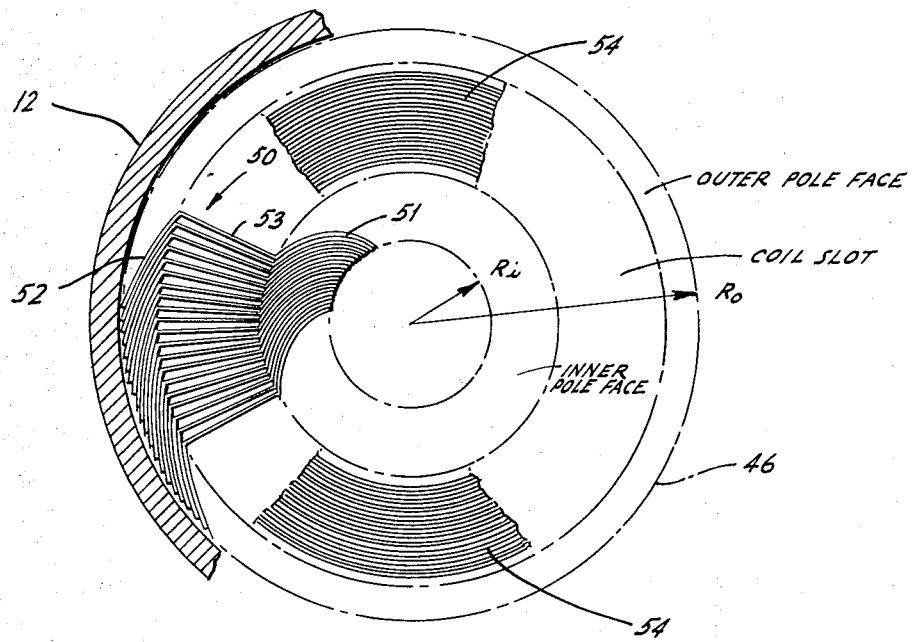
FIG. 2 is a partially fragmentary sectional view of motor core apparatus shown in FIG. 1, as seen looking in the direction of arrows 2—2 applied thereto.

Now with particular reference to FIGS. 2-5, the motor 45 for driving compressor 16 is of a cylindrical, electromagnetic type. The motor includes a cylindrical stator 46 mounted within the generally annular space defined by frame 32, 32a and housing portion 12. In particular accordance with the invention stator 46 includes ferromagnetic core laminations 50, preferably iron, of generally uniform thickness extending along the axis of the compressor cylinder 25. In further accordance with the invention, each of the laminations 50 comprises inner and outer involute sections 51 and 52, respectively, interconnected by a radially extending planar section 53. The radially extending sections 53 are spaced from one another, and extend a lesser distance along the cylinder axis than the involute sections 51, 52. Thus, by virtue of their resulting generally U-shape (FIGS. 3 and 4), sections 51, 52, 53 are cooperably positioned to form a groove, or slot, coaxial with the central axis of the device. A current carrying coil 54 is disposed within the groove. As is indicated in FIG. 2, after assembly the portions are disposed in face-to-face contact and are packed so that the assembled involute sections 51 comprise the inner pole face and the outer sections 52 comprise the outer pole face. As best seen in FIG. 1, these pole faces are presented axially of the lamination assembly.

Figure 3:
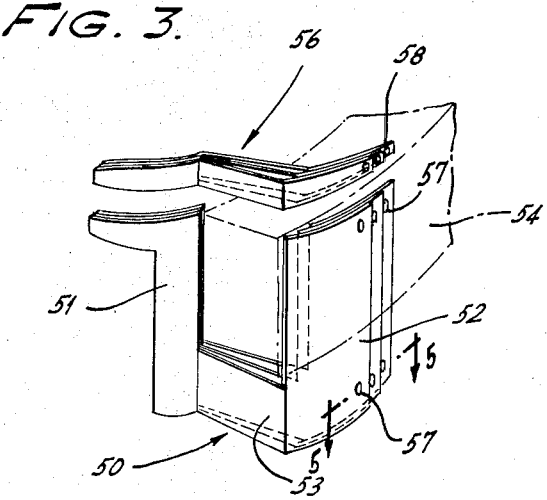
FIG. 3 is a perspective showing of core laminations of the kind characteristic of the invention.
Figure 4:
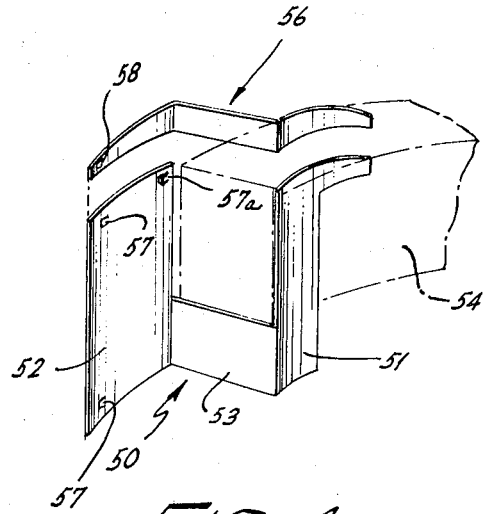
FIG. 4 is a view similar to FIG. 3, but showing the same apparatus from the opposite side.
Figure 5:
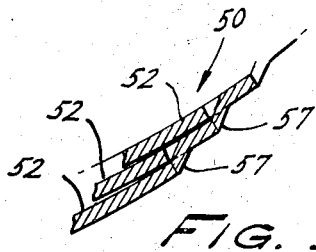
FIG. 5 is a sectional showing taken generally along the line indicated by arrows 5—5 applied to FIG. 3.

As is seen to advantage in FIGS. 3 and 5, spacing of the sections 53 (FIG. 2) is achieved by pierced tabs 57 that abut edges of adjacent outer involute sections 52, and maintain less than complete overlap of these outer sections. The spacing thus maintained ensures that sections 53 lie on radial lines when coacting with the "keystone" effect arising from the radial portions of sections 51 which prevent the lamination stack configuration from forming an inner radius surface less than $Ri$. Additional spacing guidance may be effected by pierced tabs 57a, which protrude from the opposite surface of section 52 than do pierced tabs 57, and abut groove, or slot, edges of adjacent sections 52. Tabs 57a are particularly of value when the motor supply voltage frequency is greater than 60 Hz., such as 400 Hz., for which operation thinner, less rigid, lamination stock normally is used.

Conveniently, and in accordance with known practice, the laminations 50 which comprise stator 46 are held in assembled relationship by bead welding (not shown) about the periphery of the lamination assembly. The stator is held in place by epoxy cement (not shown) applied between the laminations and the frame. The coil 54 also may be held in place by epoxy cement applied between the coil and the laminations. The inner involute sections 51 are held in the illustrated assembled position by the "keystone" effect derived from compressive forces applied radially inwardly upon application of the welded bead to the periphery of the lamination assembly. Because of the "keystone" effect, and the spacing effect of pierced tabs 57, and 57a if used, the laminations 50 can also be held in assembled relationship by the use of hoop tension applied circumferentially about the outer periphery of the lamination assembly. In final assembly the hoop tension may be effected by the press-fitting of the stator 46 into the cylindrical housing portion 12 or by the use of several individual hoops (not shown) which are concentrically located between the lamination assembly and the cylindrical housing portion 12.

The linearly movable motor armature 55 is affixed to rod 30 and includes laminations 56 having an involute-radial-involute configuration similar to the configuration of laminations 50, but of lesser extension along the axis of the core. Laminations 56 are held in assembled relation by welding or by hoop tension, and the assembled laminations are retained in the armature frame by epoxy or other cement, combined with press-fitting into a cylindrical well portion of the armature frame (not shown) such that the vertical cylindrical surfaces of the assembled laminations are in contact with the armature frame and epoxy cement and in such position that their inner and outer pole faces are opposite the corresponding faces of the stator. Spacing between the radial sections of laminations 56 is achieved by tabs 58 formed and arranged in a manner similar to tabs 57 and to serve as stacking tongues. The spacing between the radial sections of adjacent laminations 56 advantageously provides for refrigerant gas flow through openings 59 in the armature, as will be explained below. Similarly, spacing of radial sections 53 of the stator laminations 50 provide for gas flow over coil 54 to cool the same.

Additional constructional features and advantages of the invention will be understood from a consideration of operation of the disclosed apparatus. With reference to FIG. 1, electrical energy is supplied to coil 54 through lead wires 60 by way of conventional hermetically sealed terminals 61. Advantageously the spacing between radial sections 53 of laminations 50 accommodates passage of the lead wires 60 therethrough from the coil to terminals 61. A preferred source of energy is 120 v., 60 cps. which is sufficient, in combination with springs 33 and 34, to effect a rapid vibratory motion of armature 45 and of piston 26 affixed thereto. With each downward stroke of the piston, gaseous refrigerant is compressed within cylinder 25 as valve leaves 40 and 44 remain closed. At a predetermined pressure, valve leaf 44 opens, permitting compressed gaseous refrigerant to flow through port 43, connection 21, and into condenser 23. Thereafter liquid refrigerant flows through capillary tube 24 into evaporator 22. On the same downstroke of piston 26, gaseous refrigerant is withdrawn from evaporator 22 for flow through connection 20, into housing 11. The gaseous refrigerant thereupon flows through ports 59, between laminations 56, and through ports 35 into the rear or upper region of piston 26. As the piston moves upwardly, valve 40 uncovers ports 36, valve 44 covers port 43, and low pressure gaseous refrigerant enters cylinder 25 to await the next down stroke of the piston. This repetitive cycle is very rapid. Advantageously, the spaces between the radial sections of the armature laminations 56, coupled with openings 59, ensure against undesirable gas pumping by the armature per se. This same structural feature reduces the mass of the armature and piston assembly to values compatible with system resonance requirements.

There are numerous other advantages of the lamination structure contemplated by the invention. Interposition of the radial section permits fabrication of involute type laminations having increased ratios of outer involute radius to inner involute radius (i.e. $Ro/Ri$, FIG. 2). This same composite lamination construction minimizes both the reluctance of the magnetic circuit and the quantity of iron.

It will be appreciated that the present invention affords a novel involute-radial-involute lamination construction for an electromagnetic device that provides the advantages of full involute construction, while lending itself to ease of fabrication and assembly. It will also be understood that the invention has been described in the environment of refrigeration apparatus for illustrative purposes only, and that it has utility in other apparatus requiring a reciprocating drive or where lamination assemblies are preferably of concentrical configuration.

I claim:

1. For a generally cylindrical electromagnetic device, a laminated core element comprising a ferromagnetic sheet of uniform thickness having terminal regions formed as involutes of a cylindrical region about which a plurality of such laminations are to be disposed in close adjacency to one another, said lamination having a planar section disposed intermediate said involute regions and arranged to extend radially of said generally cylindrical region about which the core is to be disposed.

2. A laminated core element according to claim 1, and characterized in that said sheet is of generally U-shape, the leg portions thereof comprising said involute regions and the interconnecting loop portion comprising said planar section.

3. A laminated core element according to claim 2, and further characterized by the inclusion of spacer means on the outermost of the recited involute regions, and arranged to engage the edge of an adjacent corresponding involute region, whereby to provide for spacing of said radial planar sections of adjacent laminations when assembled in generally cylindrical array.

4. A generally cylindrical electromagnetic device comprising, ferromagnetic laminations of substantially uniform thickness extending generally in the direction of axial extension of the device, and disposed about a generally cylindrical region coaxial with the device, each said lamination including an inner and an outer involute section joined by an intermediate, radially extending section, said radially extending sections being of lesser axial extension than the involute sections, whereby to form a groove substantially coaxial with said device, and a field coil disposed within said groove.

5. A device according to claim 4, and characterized by the inclusion of spacer means on the outermost of the recited involute regions, and disposed in engagement with adjacent corresponding involute regions, whereby to provide for spacing of said radially extending sections from one another.

6. In an electric motor of the reciprocable type: generally cylindrical stator structure including electromagnetic core laminations of substantially uniform thickness extending generally in the direction of axial extension of the stator structure, each said lamination including an inner and an outer involute section joined by an intermediate radially extending section, said radially extending sections being of lesser axial extension than said involute sections, whereby to form an annular slot substantially coaxial with the axis of said structure; field coil means disposed within said annular slot; and armature structure comprising a plurality of laminations of generally radial extension corresponding to the general radial extension of said outer stator structure laminations, but being of an axial extension small as compared with said radial extension, said armature structure also including reciprocally movable frame means supporting said armature laminations in closely spaced relation to the slotted end portion of said stator structure.

7. A motor according to claim 6, and further characterized by the inclusion of resilient means for establishing and maintaining the recited spaced relation between said stator structure and said armature structure.

8. A motor according to claim 7, and further characterized in that each of said laminations includes spacer means on its outer involute section and arranged to engage the edge of an adjacent corresponding involute section, whereby to provide for spacing of said radially extending sections from one another.

9. A motor according to claim 8, and further characterized by the inclusion of openings in said frame means disposed in substantial alignment with said spaced radially extending sections, whereby to accommodate fluid flow therethrough upon reciprocable movements of said armature structure.

10. A motor according to claim 9, wherein said armature is coupled to drive a reciprocable refrigerant compressor, and in that relatively cool gaseous refrigerant is caused to flow to said compressor through said openings in said armature frame means and through said spaced radially extending lamination sections.

11. In a magnetic core, a plurality of sheet-like laminations each having inner and outer sections shaped as the involute of a circle and a generally planar section intermediate said inner and outer sections, said laminations being packed to form a cylindrical core, with the inner and outer involute sections in face-to-face contact and with the intermediate sections disposed in confronting spaced relation.

12. A core according to claim 12, and characterized by the inclusion of spacer means on the outer involute sections, and disposed in engagement with adjacent corresponding involute sections, whereby to provide the recited spaced relation of said planar sections.

13. A core according to claim 12, and further characterized in that said spacer means comprise tab means formed integrally with, and projecting generally transversely of the surfaces of said involute sections.

References Cited

UNITED STATES PATENTS

| | | | |
|---|---|---|---|
| 3,205,826 | 9/1965 | DeStefani | 310—216 XR |
| 3,238,397 | 3/1966 | Maness | 310—27 |
| 3,123,747 | 3/1964 | Glass | 310—65 XR |
| 2,865,559 | 12/1958 | Gigleu | 230—55 |
| 3,070,024 | 12/1962 | Ramberg | 310—18 XR |
| 3,312,842 | 4/1967 | Heuchling et al. | 310—17 |
| 952,105 | 3/1910 | Fish | 336—217 XR |
| 3,130,333 | 4/1964 | Freye | 310—18 |
| 432,050 | 1890 | Kammeyer | 336—217 XR |
| 2,528,415 | 10/1950 | Boorse et al. | 310—18 XR |
| 2,479,114 | 2/1950 | Curry | 310—217 XR |

FOREIGN PATENTS

| | | |
|---|---|---|
| 629,684 | 1949 | Great Britain. |
| 842,073 | 1939 | France. |

WARREN E. RAY, Primary Examiner

B. A. REYNOLDS, Assistant Examiner

U.S. Cl. X.R.

103—53; 230—55; 310—16, 216